United States Patent [19]

Benjamin et al.

[11] 3,887,203

[45] June 3, 1975

[54] QUICK CHANGE CHUCK

[75] Inventors: Milton L. Benjamin, Moreland Hills; Wilbur N. Miles, Chagrin Falls, both of Ohio

[73] Assignee: Erickson Tool Company, Solon, Ohio

[22] Filed: July 9, 1973

[21] Appl. No.: 377,635

[52] U.S. Cl. .................................. 279/50; 279/1 B
[51] Int. Cl. ............................................ B23b 31/20
[58] Field of Search ............ 279/1 B, 55, 57, 74, 50, 279/23, 43, 37

[56] References Cited
UNITED STATES PATENTS
3,790,182    2/1974    Schuman .............................. 279/43

*Primary Examiner*—Gil Weidenfeld
*Attorney, Agent, or Firm*—Woodling, Krost, Granger & Rust

[57] ABSTRACT

A quick-change chuck is disclosed which holds a tool socket having an adjustable nut thereon for axial adjustment of a tool within the tubular wall of a spindle. The quick-change chuck includes a locking sleeve secured to the spindle and a control sleeve which reciprocates on the locking sleeve. A plurality of collet fingers are carried in the locking sleeve, and each has a tapered foot to engage the outermost beveled shoulder of the adjusting nut. A tapered annular shoulder on the locking sleeve is urged by spring means to urge the collet fingers radially inwardly and lock the tool within the tubular spindle. The angle of the taper of the feet is considerably greater than the angle of the tapered annular shoulder on the control sleeve to preclude the tool being pushed out of the spindle. The foregoing abstract is merely a resume of one general application, is not a complete discussion of all principles of operation or applications, and is not to be construed as a limitation on the scope of the claimed subject matter.

12 Claims, 5 Drawing Figures

3,887,203

QUICK CHANGE CHUCK

BACKGROUND OF THE INVENTION

The invention relates generally to chucks or sockets, socket-type, side-detent, reciprocating sleeve.

For at least 30 to 40 years automotive-type spindles have been used on transfer machines, for example in automotive engine plants for machining of the engine. An automotive tool socket is receivable within the rotatable automotive spindle, and these two items have long been standardized. The spindle has a tubular wall and an open front end. The automotive tool socket fits coaxially within the spindle and has a threaded exterior portion on which an adjusting nut is received. By moving the adjusting nut, the axial position of the tool socket relative to the cylindrical shank may be achieved because the nut abuts the front of the spindle. The tool socket has a coaxial tapered socket therewithin, such as a Morse taper socket to receive the actual tool which might be a drill, reamer, tap, or the like. The cylindrical surface of the tool socket has a slight tapered flat, and a threaded aperture on the spindle is designed to contain a setscrew which may be tightened against the tapered flat to retain the tool socket within the spindle. This was used for many years, but in recent years need for greater speed in replacing tools was required. Accordingly, many attempts at quick-change chucks have been made which are usable with this automotive spindle and the automotive type of tool socket. Because transfer machines have been in use for decades and cost millions of dollars and already have the automotive type of spindle, it is necessary that any quick-change chuck for use with this automotive spindle be one which is compatible with the already existing spindles and tool sockets.

To be satisfactory enough for an automotive manufacturer to adopt a quick-change chuck on their long transfer lines, such quick-change chuck must meet many criteria; among them the quick-change chuck must be compatible with the automotive spindles already on the transfer machines and compatible with the tool sockets receivable within these automotive spindles. Second, the chuck should have a minimum of overhang beyond the end of the automotive spindle in order to eliminate runout as much as possible, runout meaning the wobble or slight conical movement of the axis of the tool. Third, the quick-change chuck should have a minimum overall length so that long tools may be used where required in the machining of the workpieces. Fourth, the chuck should have a small diameter so as not to interfere with adjacent automotive spindles which may need to be placed closely together for simultaneous working on adjacent apertures in the workpiece. Fifth, the quick-change chuck should have a minimum length of the control sleeve so that its length plus the added axial length needed for control movement to release the tool is not so excessive that it interferes with either the workpiece or the transfer machine. Sixth, the entire quick-change chuck should not be complicated, instead it should be sufficiently simple that it is a practical device with a long life and an economical manufacturing price to be accepted by the automotive companies.

A number of attempts have been made to produce satisfactory quick-change chucks, but several have not met the above criteria and have not been accepted by the automotive companies. Quick changing of tools is important because the tools need replacing whenever they become dull so that they may be sharpened, and the tools are preset in preset gauges to be at the correct length so that downtime of the transfer machine is kept to a minimum for merely the changing of the tool without requiring regauging of the length of the tool.

More recently, a new requirement has arisen; and this is the problem of pull out or push out of the tool from the tubular wall automotive spindle. Many tools have a slight forward pull such as reamers especially when the reamer is being withdrawn from the reamed hole. This pulling force might be in the order of 50 to 200 pounds, and many of the prior art units have been able to withstand this relatively small pull out force. However, now a pull out force may be in the order of 700 to 750 pounds in several applications. Gun drills are those which are extremely long for drilling long holes. They may be as much as four feet long, and typically the gun drill has only a single small flute for removal of chips. Because the hole is extremely long and deep, the removal of chips is a considerable problem. The machinists have met this problem by using higher and higher oil or liquid coolant pressures forced through the hollow spindle and a hollow oil hole in the drill to force the chips out the flute of the gun drill. However, this higher oil pressure, in the order of 750 pounds force on the rear of the tool socket, has caused the problem of forcing the tool socket out of the automotive spindle. Many quick-change chucks have used side detents on the side of the tool socket, and these generally have been balls riding in the groove of a special adapter nut. This special adapter nut is undesirable because it does not use the standard adjusting nut which for years has been used on the cylindrical shank of the tool socket. Also such special adapter nut adds axial length to the quick-change chuck to increase the overhang and the possible runout. Even where collet-type side detents have been used to retain the standard adjusting nut, the angle on the rear of the collet and the angle of engagement on the adjusting nut have been such as to permit push out of the tool with only about 200 pounds of force which has not been enough to meet the new requirements where high pressure oil is used.

Accordingly, an object of the invention is to provide a quick-change chuck which obviates the above-mentioned disadvantages.

Another object of the invention is to provide a quick-change chuck which has minimum overhang, a minimum overall length, is compatible with standard automotive spindles and tool sockets, has a small diameter and has a minimum length of control sleeve and yet obtains a high pull out force of about 1,000 pounds so that high pull out forces can be withstood.

Another object of the invention is to provide a quick-change chuck wherein collet-type fingers are utilized which fingers are flexible yet quite strong to withstand a high pull out force.

Another object of the invention is to provide a quick-change chuck which is compatible with standard automotive spindles.

Another object of the invention is to provide a quick-change chuck which uses plural individual springs which may be quite small yet have the same force on the reciprocating control sleeve as a large spring which surrounds the spindle.

Another object of the invention is to provide a quick-change chuck which is compatible with many automotive shank tool sockets on the market containing a standard adjusting nut even though such adjusting nut may vary in thickness by one thirty-second of an inch.

SUMMARY OF THE INVENTION

The invention may be incorporated in a quick-change chuck to hold a tool with a nut thereon in the open front end of a tubular spindle, said nut adapted to abut the open end of the spindle and to have a threaded adjustment on the tool for shifting the tool in an axial direction relative to the spindle, said nut having a shoulder at the junction of the outer face with a generally cylindrical surface of the nut, said chuck comprising, in combination: a locking sleeve adapted to surround the tubular spindle, means to secure said locking sleeve to the spindle, a movable control sleeve surrounding said locking sleeve, a plurality of collet fingers resiliently supported in said locking sleeve and extending toward the front end of said locking sleeve, a tapered foot on the front end of each of said fingers engageable with the shoulder of the nut, a shoulder on the inner surface of the front of said control sleeve engaging with the heel of said feet, a taper on one of said control sleeve shoulder and said heel of said feet to establish a first angle of engagement relative to said axis, the angle of taper of said feet being at least three times said first angle of engagement, and spring means acting between said sleeves to urge said control sleeve shoulder in an axial direction to urge said feet radially inwardly to lock onto the adjusting nut and lock a tool axially within the tubular spindle. Other objects and a fuller understanding of the invention may be had by referring to the following description and claims, taken in conjunction with the accompanying drawing.

DESCRIPTION OF THE PREFERRED EMBODIMENT

Figure 1:
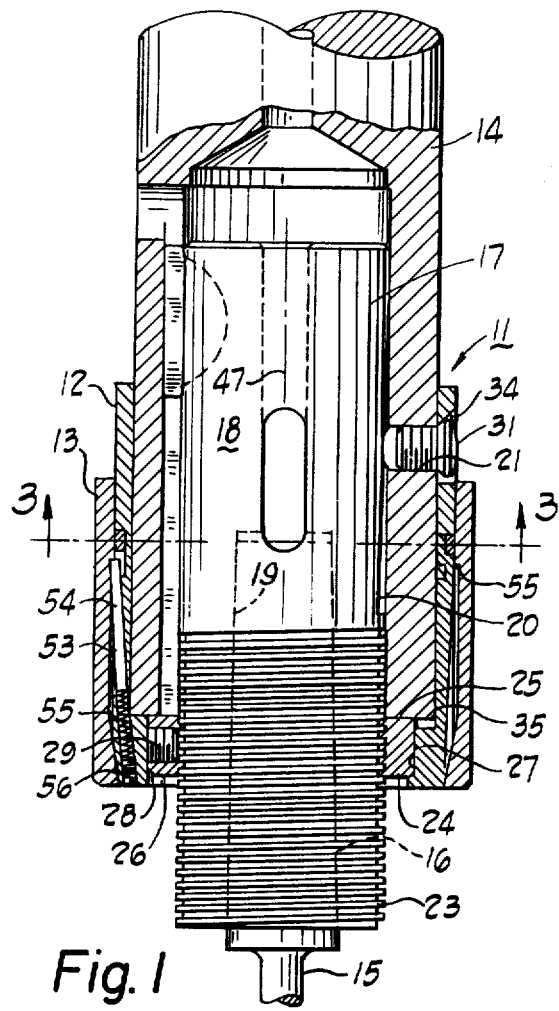
FIG. 1 is a longitudinal sectional view through a quick-change chuck embodying the invention.
Figure 2:
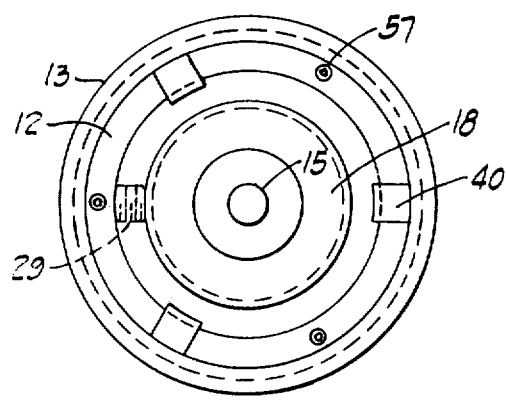
FIG. 2 is a front view of the chuck and tool socket.
Figure 3:
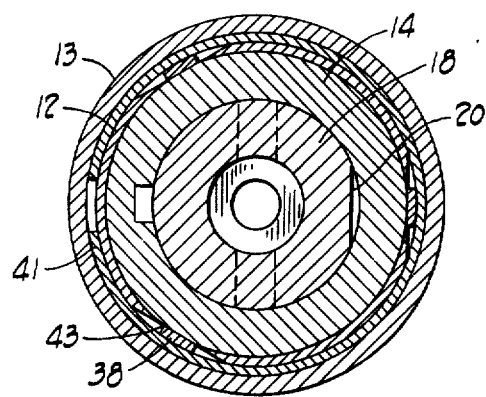
FIG. 3 is a sectional view on line 33 of FIG. 1.
Figure 4:
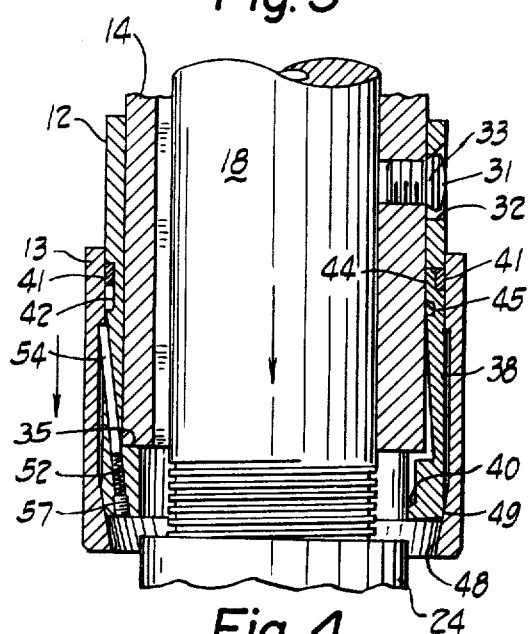
FIG. 4 is a partial sectional view similar to FIG. 1 but with the control sleeve moved to the unlocked position.

The figures of the drawing show a quick-change chuck 11 which includes generally a locking sleeve 12 and a control sleeve 13. The quick-change chuck 11 may be used in a number of applications, and in the preferred embodiment is used with a rotatable tubular spindle 14 which may be of the automotive type commonly used on transfer lines. These are machining lines wherein workpieces such as engine blocks are removed progressively past a series of machines at which drilling, reaming, tapping, etc. functions are carried on in sequence. These transfer machines have a plurality of these automotive-type tubular spindles 14 to hold various tools 15. The tools 15 have a standard taper shank 16, such as a Morse taper, to fit in a tapered aperture 19 of the cylindrical shank 17 of a tool socket 18. Such automotive-type tubular spindles 14 and tool sockets 18 have been used for decades on these transfer lines of the automotive companies. The socket 18 has a tapered flat 20 thereon. The cylindrical shank 17 was secured within the tubular spindle 14 by a setscrew received in a threaded aperture 21 in the spindle 14 and tightened against the tapered flat 20.

In recent years it has become more important to the greatest possible time in changing tools and hence quick-change chucks have become more popular. The tools need frequent changing as they become dull or on occasion broken. If the operator had to spend the time to unscrew the setscrew on each one and then retighten it upon the new tool socket, this would take considerable time. Also the spindle often stops in the wrong position so that the setscrew is not available, and the spindle has to be power jogged into the correct position or else the operator must crawl around to get access to the rear of the spindle if the setscrew is not available at the front. These many reasons have caused interest in quick-changing chucks so that a setscrew against the tapered flat need not be used.

In the standard use of automotive spindles 14 and tool sockets 18, the exterior of the tubular shank 17 is threaded at the forward end as at 23. These threads are square threads for a flat top in order to have a continuation of the cylindrical bearing surface within the tubular spindle 14. An adjusting nut 24 is threaded on the threads 23 to have a threaded adjustment relative to the tool 15. This nut 24 has a rear planar face 25 to abut the forward end of the spindle 14, and hence this provides an axial adjustment of the length of the tool 15 relative to the spindle 14. The nut 24 also has a front planar face 26, a generally cylindrical outer surface 27, which may be knurled, and a beveled annular shoulder 28 at the junction of the outer face 26 and outer surface 27. A flat tip setscrew 29 is carried in the adjusting nut 24 and may be tightened against the threads 23 to secure the adjusting nut in the proper adjusted position. For example, the nut 24 may be adjusted when the tool and socket are in a gauge to have the proper tool length relative to the planar surface 25, and this gauging adjustment may be effected prior to insertion in the tubular spindle 14. This gauging may be done at a tool crib, for example, to have a number of preset tools available to replace those which become dull. By this means time is saved for a minimum downtime of the transfer machine.

The quick-change chuck, to be successfully and practically employed by the automotive companies, must be compatible with the tubular spindle 14 and tool socket 18 described above. The quick-change chuck 11 of the present invention is compatible and meets many other criteria as well.

The quick-change chuck 11 includes the locking sleeve 12 and a control sleeve 13. The locking sleeve 12 is secured to the tubular spindle 14 by a setscrew 31 passing through an enlarged aperture 32 and engaging the threaded aperture 21 in the spindle 14. The setscrew 31 has an angular chamfer 33 on the underside of the head to engage an arcuate chamfer portion 34 on the rear edge of the aperture 32 of the locking sleeve 12. Thus by tightening the setscrew 31 against this arcuate chamfer 34, a shoulder 35 on the locking sleeve 12 is pulled axially tightly against the front end of the tubular spindle 14. This shoulder 35 may be of various radial widths depending upon the actual size of the spindle 14 and tool socket 18 and in fact in some size ranges may not be present at all. The locking sleeve 12 is coaxial with the spindle 14, and the control sleeve 13 is coaxial and surrounds the locking sleeve 12. The control sleeve 13 is movable on the locking sleeve 12 and in fact reciprocates axially.

A plurality of collet or chuck fingers, shown as three in number in the preferred embodiment, are carried in the locking sleeve 12. These collet fingers 38 are resiliently supported in some manner in this locking sleeve. They may be unitary with the locking sleeve, but in this preferred embodiment they are separate collet fingers. The fingers 38 are carried in axially parallel slots 39 and have a front end at the front of the spindle 14 whereat a tapered foot 40 is unitary with the collet finger. This tapered foot 40 is engageable with the beveled shoulder 28 of the adjusting nut 24. The collet fingers 38 are resiliently supported in the locking sleeve 12, and the feet 40 are urged generally radially outwardly. In the preferred embodiment this is effected by an elastic snap ring 41 or lock ring. This ring 41 fits inside an annular groove 42 in the outer surface of the locking sleeve 12. An aperture 43 is milled through the locking sleeve 12 to receive the rear end 44 of the collet fingers 38. Just forwardly of this aperture 43 the remaining surface of the locking sleeve 12 at the annular groove 42 provides a fulcrum 45 for each collet finger 38. The elastic ring 41 bearing against this rear end 44 urges the feet 40 radially outwardly.

The reciprocal control sleeve 13 has a first angle of engagement on the feet 40 relative to the axis 47 of the spindle 14. This first angle of engagement may be achieved by a tapered annular shoulder 48 or cone on the front of the control sleeve 13 or may be effected by a taper 49 on the heel of the feet 40. In the preferred embodiment both tapers are used, and these are matching tapers in the order of 10°, relative to the spindle axis 47. The tapered foot 40 has an angle of about 45° relative to the axis 47, and the beveled shoulder 28 on the adjusting nut 24 also has substantially a 45° angle relative to this axis 47.

Figure 5:
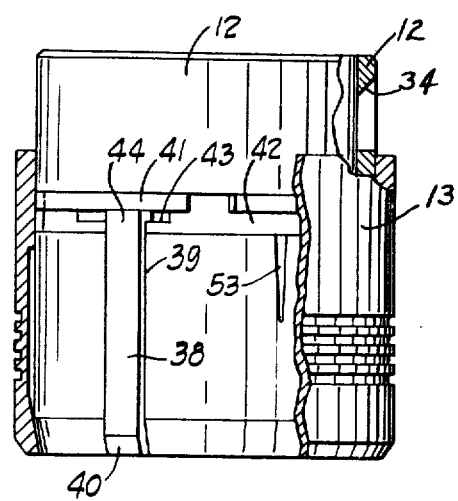
FIG. 5 is an elevational view of the locking sleeve with the control sleeve mostly removed.

Spring means 52 is provided to act between the sleeves 12 and 13 to urge the control sleeve shoulder 48 in an axial direction to urge the feet 40 radially inwardly to lock onto the adjusting nut 24 and lock a tool 15 axially within the tubular spindle 14. This spring means 52 may be a single spring enveloping the locking sleeve 12, but in this preferred embodiment is made of a plurality of springs. In the preferred embodiment there are shown three apertures 53 which are substantially parallel to the axis 47. As a practical matter these apertures 53 have a slight angle of approximately 5° relative to the axis 47. An abutment pin 54 is provided at the rear of each aperture 53, and these apertures gradually break through the outer cylindrical surface of the locking sleeve 12 as shown in FIG. 5. The rear of these abutment pins 54 engage a shoulder 55 near the rear of the control sleeve 13. The spring means 52 are individual coil compression springs 52, one in each of the apertures 53; and one end of the spring engages the front end of the abutment pin 54. The forward end of the apertures 53 are threaded as at 56 to receive a threaded plug 57 which traps the spring 52 and causes the springs 52 to act between the sleeves 12 and 13 to urge the control sleeve 13 rearwardly.

OPERATION

The quick-change chuck 11 may be readily and quickly assembled by sliding the sleeve 13 over the forward end of the locking sleeve 12. The abutment pins 54 may be inserted in the aperture 53, next the coil compression springs 52 are inserted, and the plugs 57 screwed in place. The springs 52 urge the control sleeve 13 rearwardly so that the feet 40 are urged radially inwardly.

The quick-change chuck 11 may be readily assembled on the tubular spindle 14 by the setscrew 31 engaging the threaded aperture 21. The angle chamfer 33 on the underside of the head of the setscrew 31 acts against the arcuate chamfer 34 on the locking sleeve 12 to secure the locking sleeve 12 on the spindle 14.

To insert a tool socket 18 within the quick-change chuck 11, an operator grasps the control sleeve 13, pulls it forwardly, and manually inserts the tool socket 18. This would be a tool socket with a tool 15 already in place and preferably previously preset as to length of the tool 15. This presetting is done by adjusting the axial position of the adjusting nut 24 on the threaded shank 23. The tool socket 18 is securely locked in place because the taper 40 on the front of the collet fingers 38 securely clamps over the beveled shoulder 28 on the adjusting nut 24. This is true despite variations in axial thickness of the nut by as much as one thirty-second of an inch. Despite this variation in thickness of the nut 24 the secure clamping action is achieved because of the great flexibility of the collet fingers 38. This flexibility is achieved by making them separate fingers rather than unitary with the locking sleeve 12. Also this flexibility is achieved without making the fingers extremely thin which would greatly weaken the fingers.

The tool socket 18 may readily be removed from the spindle 14 by pulling the control sleeve 13 forwardly which permits the tapered feet 40 to move radially outwardly thus releasing the adjusting nut 24.

One of the more troublesome problems recently developed is the attempted use of various prior art types of quick-change chucks with gun drills. These are long drills, for example, up to 4 feet in length which typically have only a single flute. The length of the gun drill plus the single flute greatly complicates the problem of removal of chips from the drilled hole. In an attempt to remove these chips from the drilled hole the operators have used higher and higher oil pressures through the hollow spindle 14, the hollow tool socket 18, and a hollow tool 15. These higher oil pressures have developed as much as 750 pounds force on the rear of the tool socket 18, and in the prior art forms of quick-change chucks this frequently pushed the tool socket 18 out of the tubular spindle 14. The present invention has discovered a means to solve this difficult problem, and this includes establishing the angle of the tapered feet 40 being at least three times the angle of engagement between the annular shoulder 48 and the heel 49 of the feet 40. In the preferred embodiment the angle of engagement of the tapered feet 40 with the beveled shoulder 28 of the nut 24 is a 45° angle relative to the axis 47. The first angle of engagement of the annular shoulder 48 and the heel of the feet 49 is 10°. This is a matching taper both on the annular shoulder 48 and the tapered heels 49 to provide a large bearing surface therebetween. This means that in the preferred embodiment this ratio of angles is about 4½ to 1, and this has been found to provide 1,000 pounds or more of locking force; that is, on a test arbor press, more than 1,000 pounds of force was required on the rear of the tool socket 18 in order to press the tool socket 18 out of the spindle 14. In fact, in many cases the feet 40 would break off the fingers 38 in order to effect this push out.

The transfer lines on which these automotive spindles 14 are customarily used are large, expensive machines costing more than one million dollars. The machines only make money while they are running and producing parts, and hence any downtime; that is, while they are not running, is exceptionally costly. The downtime for changing tools is kept to a minimum by quick-change chucks. If one tool breaks or is pulled out of the socket, then this can damage many things in a short length of time. For example, suppose a hole is being drilled, reamed, and tapped. At one station in the transfer line the hole is drilled. In a second station it is reamed. If the reamer should break off during pull out, then the tap which was supposed to tap this aperture would instead strike the broken reamer. This could break many other things of the transfer machine. Especially a drill or reamer often goes through a drill guide, and the drill guide could be broken. This could mean a long downtime for costly repairs to the machine and even more costly loss of production. Accordingly, it is exceptionally important that the quick-change chuck withstand a high pull out force, and the large ratio between the angle of the tapered foot 40 and the angle on the tapers 48 and 49 has been discovered to prevent this pull out.

The quick-change chuck of the present invention achieves a minimum overhang because it uses only a standard adjustment nut 24 which has been in use for decades. There is a minimum overall length again with the length practically no greater than that caused by the standard adjusting nut 24. Thus the quick-change chuck 11 is compatible with the standard automotive spindle 14 and standard automotive tool socket 18 which has been in use for decades. Some adjusting nuts are not the standard as shown in FIG. 1, instead they have greater axial length and are provided with a peripheral groove. This adds to the axial length and adds to the overhang which can increase the amount of runout or conical wobble of the tool 15. The present design eliminates this. The locking sleeve 12 and control sleeve 13 are of minimum radial dimension so that the total quick-change chuck is of small diameter. This permits close spacing of the spindles 14, a desirable feature. The plural springs 52 have just as much force as one large spring encircling the locking sleeve 12 and have the added advantage of providing a minimum length of control sleeve, it need not be as long as the locking sleeve 12. This simplifies the matter of securing the locking sleeve 12 to the tubular spindle 14 and saves material and cost in the control sleeve 13. The collet fingers 38 being separate pieces from the locking sleeve 12 can be made thick and strong in a radial dimension instead of thin to achieve flexibility as in a unitary collet finger design. Because the collet finger 13 is separate, it is thick and strong and hence will not break under the high push out forces achieved by high oil pressure on the rear of the tool socket 18.

There are thousands of the automotive type tubular spindles 14 in use today, and millions of the tool sockets 18 together with the standard adapter nuts 24. Accordingly, it is quite important that the quick-change chuck 11 is compatible with these existing automotive spindles and sockets. Also with millions of these tool sockets 18 in use, and each already furnished with the standard nut 24, it is impractical to attempt to again provide each of these with an adjusting nut wherein the axial thickness is closely controlled, e.g. ± 0.001 inches. If such axial thickness could be closely controlled, then the prior art form of quick-change chucks might be satisfactory to lock this precise thickness of nut within the chuck. However, since these nuts do vary by as much as one thirty-second of an inch in thickness, it has been found that the prior art chucks could not accomodate this range of thickness and effectively lock each different thickness of nut within the chuck. The present chuck has provided a design which does give this locking force of over 1,000 pounds, despite this variation in nut thickness.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A quick-change chuck to hold a tool with a nut thereon in the open front end of a tubular spindle,
    said nut adapted to abut the open end of the spindle and to have a threaded adjustment on the tool for shifting the tool in an axial direction relative to the spindle,
    said nut having a shoulder at the junction of the outer face with a generally cylindrical outer surface of the nut,
    said chuck comprising, in combination,
    a locking sleeve adapted to surround the tubular spindle,
    means to secure said locking sleeve to the spindle,
    a movable control sleeve surrounding said locking sleeve,
    a plurality of chuck fingers resiliently supported in said locking sleeve and extending toward the front end of said locking sleeve,
    a tapered foot on the front end of each of said fingers engageable with the shoulder of the nut, said chuck fingers being separate from said locking sleeve and supported in axially parallel slots in said locking sleeve,
    an elastic locking ring urging the feet of said chuck fingers radially outwardly,
    a shoulder on the inner surface of the front of said control sleeve engaging with the heels of said feet,
    a taper on one of said control sleeve shoulder and said heels of said feet to establish a first angle of engagement relative to said axis,
    the angle of taper of said feet being at least three times said first angle of engagement,
    and spring means acting between said sleeves to urge said control sleeve shoulder in an axial direction to urge said feet radially inwardly to lock onto the adjusting nut and lock a tool axially within the tubular spindle.

2. A quick-change chuck as set forth in claim 1 wherein said tapered foot has an angle of substantially 45° and said first angle of engagement is in the order of 10° to 15°.

3. A quick-change chuck as set forth in claim 1 wherein said first angle of engagement is in the order of 10°.

4. A quick-change chuck as set forth in claim 1 wherein said control sleeve shoulder is a tapered conical shoulder having an angle of approximately 10° to 15° relative to said axis.

5. A quick-change chuck as set forth in claim 1 wherein said heels of said feet have a tapered surface in the order of 10° to 15° relative to said axis.

6. A quick-change chuck as set forth in claim 1 wherein the nut has a beveled shoulder at the junction of the outer face with a generally cylindrical outer surface of the nut, and said tapered foot is at an angle of about 45° relative to said axis to engage the beveled shoulder of the nut.

7. A quick-change chuck as set forth in claim 1 including an annular groove on the outer surface of said locking sleeve, each said chuck finger having a rear end thereof engaged and encircled by said elastic ring, and a fulcrum for each chuck finger intermediate the end engaged by said elastic ring and said foot thereon.

8. A quick-change chuck as set forth in claim 1 wherein said spring means includes a plurality of springs supported substantially axially between said sleeves.

9. A quick-change chuck as set forth in claim 1 wherein said securing means is a setscrew to threadably engage a threaded aperture in the spindle and secure said locking sleeve to the spindle.

10. A quick-change chuck as set forth in claim 9 wherein said locking sleeve includes an enlarged aperture to receive said setscrew, and a tapered shoulder at one end of said locking sleeve aperture engaging with a tapered under surface of the head of the setscrew to urge the locking sleeve in one axial direction as the setscrew is tightened.

11. A quick-change chuck to hold a tool with a nut thereon in the open front end of a tubular spindle, said nut adapted to abut the open end of the spindle and to have a threaded adjustment on the tool for shifting the tool in an axial direction relative to the spindle, said nut having a shoulder at the junction of the outer face with a generally cylindrical outer surface of the nut, said chuck comprising, in combination, a locking sleeve adapted to surround the tubular spindle, means to secure said locking sleeve to the spindle, a movable control sleeve surrounding said locking sleeve, a plurality of chuck fingers resiliently supported in said locking sleeve and extending toward the front end of said locking sleeve, a tapered foot on the front end of each of said fingers engageable with the shoulder of the nut, a shoulder on the inner surface of the front of said control sleeve engaging with the heels of said feet, a taper on one of said control sleeve shoulder and said heels of said feet to establish a first angle of engagement relative to said axis, the angle of taper of said feet being at least three times said first angle of engagement, a plurality of apertures in said locking sleeve substantially parallel with said axis, and spring means including individual springs in said apertures acting between said sleeves to urge said control sleeve shoulder in an axial direction to urge said feet radially inwardly to lock onto the adjusting nut and lock a tool axially within the tubular spindle.

12. A quick-change chuck as set forth in claim 11 including an abutment pin in each of said apertures abutting against said control sleeve, said apertures being threaded at the front end thereof, said individual springs being a coil compression spring in each of said apertures engaging at one end thereof said abutment pin, and a threaded plug at each of said threaded apertures engaging the other end of each spring to urge said control sleeve in a direction away from the front end of said locking sleeve.

* * * * *